United States Patent [19]

Lang

[11] 4,020,005

[45] Apr. 26, 1977

[54] GELLED REAGENT MATERIALS

[76] Inventor: John L. Lang, P.O. Box 1242, Midland, Mich. 48640

[22] Filed: Jan. 19, 1976

[21] Appl. No.: 650,454

Related U.S. Application Data

[63] Continuation-in-part of Ser. No. 552,053, Feb. 24, 1975, abandoned, which is a continuation-in-part of Ser. No. 155,345, June 21, 1971, abandoned, which is a continuation-in-part of Ser. No. 734,553, June 5, 1968, abandoned, which is a continuation-in-part of Ser. No. 531,755, March 4, 1966, abandoned, which is a continuation-in-part of Ser. No. 242,910, Dec. 7, 1962, abandoned.

[52] U.S. Cl. .................. 252/316; 252/188.3 R; 252/408; 424/21; 424/37
[51] Int. Cl.$^2$ ..................................... B01J 13/00
[58] Field of Search ............... 252/188.3, 316, 408; 424/21, 37

[56] References Cited

UNITED STATES PATENTS

| | | | |
|---|---|---|---|
| 871,612 | 11/1907 | Nesfield | 252/188.3 |
| 2,967,834 | 1/1961 | Daniel et al. | 252/429 |
| 3,919,110 | 11/1975 | Vassiliades et al. | 252/316 |

*Primary Examiner*—Brooks H. Hunt
*Assistant Examiner*—E. Suzanne Parr

[57] ABSTRACT

Reagents can be provided in more convenient and readily-utilizable forms by converting the basic desired reagent material into a shapeable solid using gelation techniques (i.e., a non-crystalizing solidification process) for the fluids that are carriers and/or vehicles for the reagent. The resulting solidified gel product can be shaped as desired or needed into such practically useful forms as ribbons, tablets, capsules, pellets, etc. The gelled reagent materials are oftentimes more storeable and have markedly increased shelf-lives over the same reagents, per se, in ungelled form. Additionally, the gelled reagent materials possibilitate very much simplified proportioning, measuring out or supply of desired tare of the reagent material itself by the easy expedient, depending on the shape utilized of the solidified gelled reagent material involved, of depending upon mere number count in the case of pellets, tablets or the like or length of material in the case of ribbon, wire or the like according to the predetermined assay of reagent in any given physical unit of the shaped gelled reagent material. This, as a great convenience and with optimum accuracy, obviates the weighing or otherwise measuring out by normal techniques of the reagent material itself as it is done in conventional practice. The gelled reagent materials react freely and in the expectable way when put in a given reaction mass or material being tested or processed upon disruption of the gel when placed therein giving rise to release of the reagent, per se.

6 Claims, No Drawings

GELLED REAGENT MATERIALS

REFERENCE TO RELATED APPLICATIONS

This application is a continuation-in-part of co-pending and herewith abandoned application Ser. No. 552,053, filed Feb. 24, 1975, for "Gelled Reagent Materials", which co-pending and herewith abandoned application was a Continuation-in-Part of the now-abandoned Application Ser. No. 155,345, filed June 21, 1971, entitled "Gelled Reagent Materials", which application was a continuation-in-part of the now-abandoned application Ser. No. 734,553, filed June 5, 1968, for "Gelled Reagents" which in turn was a continuation-in-part of the now-abandoned application Ser. No. 531,755, filed Mar. 4, 1966, for "Gelled Reagent Species", which in turn was a continuation-in-part of the also now-abandoned application Ser. No. 242,910, filed Dec. 7, 1962, for "Gels Containing Metals and Their Ions".

DESCRIPTION AND CHARACTERIZATION OF INVENTION

This invention pertains to new and improved forms for usage of various reagent species and the preparation thereof.

An object of the invention is to provide more convenient and readily-utilizable forms of chemical reagents.

Another object of this invention is to provide various chemical reagents and reactive ingredients in a form in which they can be easily and conveniently stored without loss of reactive nature and with the advantage, in many cases, of greatly increased shelf-life for the reagent material, per se, as compared to normally and conventionally available forms and preparations of the same reagent material.

A further object of this invention is to provide chemical reagents in a solidified form made into desired and functional shape to fill specific individual usage requirements on a most practical and easy-to-employ basis.

Many of the very valuable chemical reagents, including catalytic materials, are naturally possessed of a fugitive and non-longeval character. Some such materials are reactive to the extent that they must be immediately or almost-immediately employed upon their in situ preparation. As a result, such materials are not susceptible of shipment, storage or other prolonged handling and, accordingly, are not truly articles of commerce despite their desirability for many purposes for preparation and use. Obviously, despite the desirability of such reagent or catalytic materials for many purposes, their fugitive and short-lived tendencies make them at least relatively uneconomical to utilize in anything but large-scale and more or less expensive operations. This is plainly disadvantageous when such materials are desired for utilization in any relatively small-scale operations.

Other valuable chemical reagents and catalysts are very difficult to handle due to such tendencies thereof as spontaneous decomposition of flammability in the presence of air so that, for one reason or another, they may require storage in tightly-closed vessels and the like; the same causing considerable inconvenience and expense.

Illustrative of the above-described materials are such reagent materials as those comprised of the chromous ion and the well-known Grignard reagent which materials are ordinarily prepared and used in situ since advance preparation and storage thereof is virtually impossible.

Along similar lines, it is also well known that many reagent and catalytic materials are prone to become inactive and unreactive when exposed to such influences as air, moisture etc. which tend to reduce or eliminate chemical potentials of the involved materials or even when exposed to such physical conditions that may deteriorate the material as heat, light, mechanical deformation, etc. Certain salts of acidic- and/or basic-polymers are exemplary of this.

It has now been found, and this discovery is the basis of the present invention, that the above-delineated objectives and advantages of the present invention can be achieved and the above-indicated problems overcome by preparing the desired chemical reagent (including catalytic) material in a shapeable solid form by gelation using for the purpose a polymeric gelling agent (or combination of agents) that forms a gel with the reagent material, per se, that is involved or with the fluid solvent or other vehicle material in which the reagent is dissolved, which is inert (or at least relatively so or not deleteriously reactive) with/or to the reagent being employed, and which is soluble or dispersable in the medium or mass in which the reagent is intended to be utilized so that, on incorporation therein, the the effect of the gelling agent is overcome by the additional solvent, to free and release the reagent for its desired action in the medium or mass in which it is intended to be employed.

In other words, the gelled reagent material of the present invention comprises a chemical reagent plus a gelling agent, which combination consists essentially of a shapeable substance, with or without a protective coating surrounding it. Such shaped reagents can be stoichiometrically regulated so that these reagents can be measured out for use by means other than weighing, and thus the present invention facilitates and makes feasible the handling, the measurement, and the storage of chemical reagents, and especially very reactive chemical reagents, by the stabilizing action of gellation.

As explained, and of great advantage, the gelled reagent materials of the present invention can be physically shaped in any desirable solid form to achieve and improve the realization of such factors for the reagents involved as storage, handling, rate of reaction, measurement and dispensation, etc. The solidified gelled reaction materials of the present invention can be used in the form immediately obtained according to practice of the invention or their characteristics and properties may be still further enhanced for many purposes and applications by encapsulation of the solidified gel form in an additional and still further protective invert coating. Utilization of the additional inert coating over the solidifed gelled reaction material frequently possibilitates release of the reagent or catalytic material involved at a very precise rate which is oftentimes of a much higher degree and performance quality than is customarily obtainable in conventional reagent usage. Such additional inert coverings or coatings which are comprised, of course, of materials that are inert to the reaction of the reagent or mass or medium into which the reagent is being discharged, and which are removable to free the thereby protected and covered gelled reagent material by such means as solution, disintegration, crushing and the like, enable the chemical reagents that are employed to be handled, measured, dispensed and used with maximum and optimum ease and safety.

In any case, the measurement of reagent materials prepared according to the present invention in order to provide precisely desired quantities of the involved chemical reagent, catalyst or other material being utilized is much simplified. The measurements can be made in a leisurely and convenient way by mere taking into account the assay per given physical volume of quantity of the desired reagent in the gelled reagent material and reckoning or calculating the desired reagent charge to be made according to physical dimensions involved. As an illustration of this, in preparation of a specific formulation a ribbon-form, for example, of a given gelled reagent material having a known quantity of the desired reagent per given unit of length of the ribbon can merely and most simply be measured out and cut to length so as to obviate the necessity for any weighing operations in order to have the desired amount of reagent available for usage.

As is apparent, more than a single reagent can be incorporated in a given gelled reagent material in accordance with the present invention, particularly when encapsulation techniques are utilized for the containment of the gelled reagent materials involved. Thus, reagents and/or catalysts and the like can be arranged and provided in layers or plies or equivalent combined assemblies to form what might be termed "poly-ply", "poly-component" laminar or combined structures (which can even be in cabled or stranded or, alternatively, sequential unit forms) wherein the diverse reagents, chemicals, catalysts or other materials which, for purposes of speaking, may be characterized as "A", "b" and/or "C", etc., that are prepared in the gelled reagent material form of the present invention (and which, individually, may or may not be encapsulated or protectively coated) may, depending upon the particular physical configuration in which they are constituted, be associated and assembled together in succeeding layers or plies or alternative units (such as blocks, squares, tablets or the like) or in cable form or however else may be desired. Naturally, layers of inert material, especially when encapsulation is utilized, may be employed to separate the various gelled reaction materials utilized in any such structure. In this way, the required or desired number of plies, layers or other physical units may be put up to contain, for example and merely for illustration, Reagents "A" and/or "B", etc., Catalysts "I" and/or "II", etc., and so forth, each being separately comprised and constituted in the resulting structure so as to form a "poly-ply" and/or "poly-component" reagent and/or catalyst laminar or other physically arranged system which, with advantage in many cases, may be totally encapsulated to provide the competed structure for utilization.

A sometimes particularly advantageous and desirable form for physical constitution of a multiple gelled reagent material construction in accordnace with the present invention is to prepare and put up the diverse reagents, catalyst, etc. in a concentrically laminated and stratified modular form much in the style of coaxial cable wherein, for example, Reagent "A" is in the center, Reagent "B" (or Catalyst "I") is in the next concentric ply or ring, Reagent "C" (and/or Catalyst "II") is in the next concentric ring, and so forth to whatever degree of multiplicity may be desired or needed for the purposes at hand; with individual sections being, if desired encapsulated and contained within inert protective coating layers and the entire assembly being similarly coated if so desired.

Typical liquidous or solutions of reagents, chemicals, and/or catalysts and species thereof which may be advantageously handled and prepared in accordance with the practice of the present invention in merely representative and exemplary illustration, are those including such materials and compositions as: organometallic compounds such as the alkyl aluminums, alkul aluminum hydrides, alkyl aluminum halides, the so-called and well-known "Ziegler", "Natta" and/or "Swarc" polymerization initiating and catalyzing systems, phenyl lithium, n-butyl lithium, alkyl zinc halides, dialkyl zincs, the so-called "Grignard" reagents, lithium aluminum hydrides, sodium (and other alkali metal) borohydrides and the like; alkoxides and aryloxides such as sodium (and other alkali metal) ethoxide, sodium propoxide, potassium tert.-butoxide, aluminum tri-isopropoxide, aluminum tri-ethoxide, sodamide; lithium amide and the like; compounds, as pyridine and it homologs, carbon disulfide, ethylene imine, homologues of ethylene imine, cyanohydrins, ethers, formaldehyde and other aldehydes, the pyridinepiperidine mixture used in the so-called "Doebner" reaction, reactive acid halides such as acetyl chloride, adipoly chloride, sebacoyl chloride, terphthaloyly chloride, oxalyl chloride, alkyl sulfonyl halides, sulfur chlorides, sulfur bromides and the like; the so-called "Herz bodies", cyanogen chloride, hydrazine, hydroxylamine, amines, liquid ammonia, solutions of ammonia, solutions of bases, solutions of acids, solutions of salts; acids, per se, bases, per se, salts, per se, such as zinc chloride, sodium arsenite, sodium hydroxide, hydrochloric acid, sulfuric acid, sodium acid sulfate, acetic acid, acetic anhydride, arsenic trichloride; bromine, chlorine bromides, iodine chlorides, dispersed amalgamated metals such as dispersed zinc or the so-called "Radzivanovski" reagent; boric esters, phosphate esters, phosphite esters, silicate esters, isocyanates, diisocyanates, polyisocyantes; and their various precourser substances, such as carbamoyl chlorides; carbon suboxides; various epoxy compounds and reactive epoxidized materials; glycidic esters; ethyl diazoacetate; ethyl acetate; malonic esters, succinic esters; resonance hybrids of ethyl acetate, such as sodio-ethyl acetate; resonance hybrids of various malonic esters, such as sodio-malonic ester; resonance hybrids of various succinic esters, such as sodio-succinic ester; such reagents as the alpha-haloester zinc "Reformatsky" reagent; chloromethyl methyl ether; such ortho esters as ortho-formic ester; ethyl orthocarbonate and the like; azalactones; alkylidene triaryl phosphoranes; the so-called "N-ylides" and "P-ylenes" of the type used in the well-known Wittig reaction; imidoesters; methiodides; the so-called "Komarowsky" reagent; such popular test materials as the so-called "Fehling's Solution", "Benedict's Solution", "Vleminck's Solution", "Tollen's Reagent", "Fenton Reagent", "Ivanoff Reagent", "Folin Reagent", "Adamkiewicz-Hopkins Reagent", "Indophenin Reagent", "Millon Reagent", "Molisch Reagent", "Pauly Reagent", "Plugge Reagent", "Sakaguci Reagent", "Shryver Test Reagent", "Erlich Reagent" and "Topfer Reagent"; mixtures of resorcinol and dilute hydrochloric acid; basic ferrous acetatehydrogen peroxide mixtures; and stratified or laminated reagent/reagent-catalyst bodies; and many more of the like, analogous or similar materials.

Where the presence of a liquid phase is required for formation of the gelled and thereby solidified reagent and/or catalyst or other chemical species in the practice of the present invention, the solvents or other vehicles to be employed are those which are apparent to anyone skilled in the art selected on the basis of compatability with and non-reactivity to the materials involved in any given particular system at hand.

The gelling agent or agents utilized may be any suitable for the purpose as may be selected from a great variety of available materials, again, depending on specific components and usages involved, as will be readily apparent to anyone skilled in the art. These, as indicated, are polymeric in nature and have the properties and characteristics particularized in the foregoing, including, in particular, sufficient solubility in the liquid or solvent to form a gel, and non-reactivity with the employed reagent or catalyst and inertness in the reaction mass or medium in which the gelled reaction material of the invention is to be incorporated. Typical of suitable polymeric materials capable of gelling given reagents and catalysts are those included in the follownng itemization, without necessary limitation thereto, such as: polymers of maleic acid, maleic anhydride, acrylic acid, methacrylic acid, itaconic acid, aconitic acid, dialkylaminoalkyl acrylates, dialkylaminoalkyl methacrylates, vinyl sulfonic acid, vinyl benzene sulfonic acid, phenol sulfonic acid, isopropenyl benzene sulfonic acid, vinyl benzoic acid, the so-called "coal acids", the so-called "trona acids", carboxymethylcellulose, acrylonitrile, hydrolysis products of acrylonitrile, aminoalkyl acrylates, monoalkylaminoalkyl methacrylates, vinyl benzyl chloride, isopropenyl benzyl chloride, vinyl benzyl bromide, isopropenyl benzyl bromide, reaction products of vinyl benzyl chloride with mono-substituted and/or di-substituted and/or cyclic-organic nitrogen compounds, the same as regards reaction products of isopropenyl benzyl chloride and/or isopropenyl benzyl bromide and/or vinyl benzyl bromide, the vinyl and/or isopropenyl/benzyl tri (lower alkyl) ammonium halides (particularly the chlorides and bromides), reaction products of aminoacetic acid and/or iminodiacetic acid with vinyl and/or isopropenyl benzyl halides (particularly the chlorides and bromides), reaction products of thiol-(lower alkanoic acid) and/or thio-di-(lower alkanoic acid) and/or dithio-di-(lower alkanoic acid) with vinyl and/or isopropenyl benzyl halides (particularly the chlorides and bromides), reaction products of lower and/or di-lower alkyl sulfides and/or disulfides with vinyl and/or isopropenyl benzyl halides (particularly the chlorides and bromides), reaction products with ammonia of vinyl and/or isopropenyl benzyl halides (particularly the chlorides and bromides) as well as the analogous reaction products excepting to substitute lower alkyl amines and/or the various nucleophilic reagents for the ammonia, vinyl pyridines and/or quarternized vinyl pyridines and their homologues, vinyl pyrollidones, vinyl oxazolidinones, polyesters, synthetic polyamides, modified dextroses, urea-melamine compositons, hexamethylene tetramine, aldehydes and particularly formaldehyde, soluble polymers of phosphoric acid, sulfuric acid, silicic acid, boric acid, and analogs of such polymers, various vinyl esters, styrene and its homologues and analogues including ethyl styrene, vinyl toluene, alpha-methyl styrene, ar-chlorostyrene, ar-dichlorostyrene, tert.-butyl styrene, divinylbenzene, the alkyl acrylates and methacrylates, the vinyl and vinylidene halides, methacrylonitrile and the easily soluble olefinic, diolefinic and polyolefinic materials; and the like or equivalent and analogous materials including various copolymeric and derived polymeric materials in appropriate molecular weight ranges for any given species to be gellable and solidifiable when in contact with a suitable fluid for the purpose when utilized in accordance with practice of the present invention.

The following Examples, wherein unless otherwise specified all parts are by weight are given to further illustrate practice of the present invention:

FIRST EXAMPLE

A mixture of 195 parts of ethyl-2-bromobutyrate was made with 500 parts of tetrahydrofuran. This was then added portionwise to 65.4 parts of zinc metal, while refluxing and stirring the reactants. The addition was regulated to maintain the temperature of reaction. After the addition was completed, the stirring and reflux was continued until the zinc was essentially completely reacted. The contents of the reactor were cooled, filtered and placed in a stirred vessel. A gelling agent was previously prepared by emulsion copolymerization of p.-tert. butyl styrene with enough commercial divinylbenzene so as to contain 0.05% of the crosslinking monomer. To 250 parts of the above-prepared and so-called "Reformatsky Reagent" there was added 30 parts of the p.-tert. butyl styrene microgel with heating and agitation. When thoroughly mixed, the resulting mixture was thus gelled and after cooling formed a stable, storeable material in contrast to the previously and ordinarily known unstable and non-storeable "Reformatsky Reagent".

SECOND EXAMPLE

It is known to prepare benzoin with an aqueous/alcoholic solution of potassium cyanide. A conveniently handled, gelled form thereof was made by dissolving 3 parts of potassium cyanide in a mixture of 20 parts of de-ionized water and 45 parts of ethyl alcohol. This was then gelled by adding 15 parts of medium range viscosity polyvinylalcohol. The resulting gel composition was cut into pieces of desired size and in such form was added in appropriate amounts with benzaldehyde to satisfactorily prepare benzoin according to the known reaction. It was not necessary to weigh the cut up pieces to get the proper quantity of the gelled potassium cyanide in the reaction mass.

THIRD EXAMPLE

The so-called "sodio" derivatives of active alpha-hydrogen compounds are very useful intermediates in the syntheses of the sort known as "acetoacetic ester", "Stobbe", "malonic ester", etc. A gelled reaction material for catalytic reagent purposes in accordance with the invention was prepared as follows: A three-neck reaction flask, fitted with a stirrer, reflux condenser and thermometer, was charged with 0.2 molecular weight equivalents of alcohol-free sodium ethoxide and 1.2 molecular weight equivalents of ethyl acetate. The contents of the flask, with continued stirring, were maintained at 78° C. for 8 hours. Into the flask there was then introduced 40% on a total weight basis of flask contents of high molecular weight polystyrene. The stirring was stopped after dissolution of the polymer in the liquid phase and the contents of the flask then poured into a cooling tray under a blanket of dry nitrogen. The mixture of reagent and polymer then gelled and could be readily cut into pieces for easy handling and measurement into the indicated types of reaction masses.

FOURTH EXAMPLE

Many reducing agents, especially aldehydes and certain monosacharides, are frequently tested by use of the so-called and well-known "Fehling's Solution", upon which the so-called "Benedict's Solution" is a more stable modification of the reagent for such testing. "Fehling's Solution" reagent with vastly improved storage stability can be made by gelling the reagent in accordance with practice of the present invention. In demonstration of this, a standard "Fehling's Solution" was prepared pursuant to the instructions therefor at page 887 in Volume I of Beilstein. Accordingly, one solution containing 69.3 grams per liter of cupric sulfate pentahydrate was made up and another prepared so as to contain 346 grams per liter of Rochelle salt and 200 grams per liter of anhydrous sodium carbonate. Equal volumes of these prepared stock solutions were mixed to make the test solution. To 20 ml of the test solution there was added 20 grams of "Elvanol 72-51", a commercially-obtainable polyvinylalcohol. The resulting material was a stiff blue gel. After storage for several days, a portion of the gelled reagent material was tested with a solution of sodium formaldehyde sulfoxylate and a positive test result was obtained as evidenced by formation of an orange-yellow precipitate.

FIFTH EXAMPLE

Carbon disulfide, a very volatile material, is well known to be difficult to handle and, in particular, to have capricious combustion characteristics. Preparation of carbon disulfide into a gelled reagent material according to the present invention can overcome and minimize the difficult properties of carbon disulfide for use as a reagent. To demonstrate this, there was placed in a closeable container 5.5 parts of polybutadiene rubber and 24.5 parts of carbon disulfide. After 12 hours, the contents of the container had formed into a smooth and stiff gel. The gel product was cut into pieces of desired size and, as such, were easily handled in desired reactions for carbon disulfide and did not require weighing to get given amounts of the reagent into a given reaction since the same was determinable readily from the size of the cut. Additionally, the pieces could also be ignited safely and without danger and thus were useful as fuel particles.

SIXTH EXAMPLE

To 100 parts of a 10% solution of ethyl aluminum sesquichloride in benzene there was added 45 parts of a high molecular weight polystyrene; all under an atmosphere of dry nitrogen. Solution was effected by agitation for 16 hours. The sample was heated under reduced nitrogen pressure until 70 parts of benzene was distilled off. The hot mixture of organometallic compound, polystyrene and residual benzene was pressed into rod form under dry nitrogen and cut into cylindrical pellets. While still under the dry nitrogen atmosphere, the pellets were spray coated with poly-tert.-butylstyrene microgel (containing 0.2% divinylbenzene reacted in the polymer) using an "aerosol" preparation thereof containing a highly volatile and rapidly-drying solvent and a fluorocarbon propellant. The resulting encapsulated organometallic gelled reagent material was non-pyrophoric and could be released for utilization by placement in a dry solvent material for the gel.

SEVENTH EXAMPLE

A solution containing 1.35 parts of ferrous sulfate heptahydrate and 8.65 parts of deionized water was made up, to which there was added 1.5 parts of sulfonated polystyrene with warming. This was cast into discs having diameters of 12 mm and thicknesses of 3mm with individual disc weights being such that each disc comprised 1.0 parts of the mixture of the specified ingredients. The discs were then coated with a solution of 1.5 parts of sulfonated polystyrene in 8.5 parts of deionized water. Another solution was prepared which consisted of 17.1 parts of 10% hydrogen peroxide which had been gelled by addition of 10 parts of "Macaloid" which is a proprietary brand of pulverized hectorite. Hectorite is a mineral which, as is well-known, forms gels with water and/or aqueous solutions and/or other polar solvents. This gelled material was formed into discs of 12 mm diameter and 5 mm thickness which were bonded to the encapsulated ferrous sulfate discs described above using sulfonated polystyrene solution for the purpose. After drying the two-ply arrangements of the catalyst (ferrous sulfate) and the reagent (hydrogen peroxide) were further encapsulated with another coating of the sulfonated polystyrene solution to form the thereby-produced gelled reagent material of "Fenton Reagent". This material in the form prepared according to the invention could be used to carry out the controlled oxidation of hydroxyl group to ketone group according to the well-known reaction for same utilizing such reagent. The "poly-ply", "poly-component" reagent laminated structure made following the immediate example was well and easily adapted for use in such reactions.

EIGHTH EXAMPLE

An encapsulated, "poly-ply", "poly-component" reagent/reagent/catalyst gelled reagent, etc., material according to the present invention was made as follows:

A base ply consisting of a warmed solution of 20 parts by weight of a sulfonated high molecular weight polystyrene in 80 parts by weight of deionized water was cast on a glass support. When this ply became sufficiently non-flowable, a second ply or layer, consisting of 19.0 parts of finely ground iodine crystals in 11.0 parts of the sulfonated polystyrene aqueous solution in which a part of the iodine was dissolved was cast on top of the base ply or layer. The third ply made was an interlayer of the sulfonated polystyrene solution which was coated upon the second layer after sufficient non-flow character was developed by the iodine-containing ply or layer. When this interlayer became sufficiently one-flowing, a layer or ply consisting of 1.15 parts by weight of ethanol, 2.0 parts of polyacrylic acid and 6.85 parts of deionixed water was coated thereon. After this layer or ply became sufficiently non-flowing, another interlayer of sulfonated polystyrene was used to cover the alcohol-containing layer. When this layer became non-flowing for all practical purposes, a layer or ply of high $Na_2O:SiO_2$ ratio sodium silicate solution was applied. When this became sufficiently non-flowable, the alkaline ply or layer was coated with sulfonated polystyrene solution. After this last ply or layer became, for all practical purposes, non-flowing, the "poly-ply" reagent/reagent/catalyst structure was separated from the supporting glass and encapsulated by coating with another layer of sulfonated polystyrene solution. After this encapsulating coat became non-flowing, the final Iodoform (one type of haloform) reaction system, which consisted of the finally encapsulated "poly-ply" reagent/reagent/catalyst ribbon structure was complete. An Iodoform reaction was carried out using this structure by placing the same in water which disrupted the integrity of each ply of the structure which effected mixture of the ingredients thereof and enabled the desired reaction to proceed to produce Iodoform.

NINTH EXAMPLE

A laminated "poly-ply", "poly-component" reagent-/catalyst structure was prepared in accordance with the present invention to provide a so-called "Selivanov" reagent. To do this there was first added 3.5 parts of "Hectorite" (a mineral gelling agent) to a solution of 0.2 parts of resorcinol in 9.8 parts of deionized water. A solution of 1.0 part of concentrated hydrochloric acid in 9.0 parts of deionized water was prepared and 3.5 parts of the "Hectorite" added thereto. The mixture containing the hydrochloric acid was warmed and a ribbon thereof cast on a glass plate. When this first ply or layer was set, a ply of the resorcinol-containing gellable composition was cast over the top thereof. A third ply of the hydrochloric acid-containing mixture was gelled over the second ply. The thereby-resulting gelled "Selivanov Reagent" in "poly-ply" form was then removed from the glass support and was ready for use, per, se, immediately or after storage.

TENTH EXAMPLE

A "Sakaguchi Reagent", used to test for guanidine derivatives, was prepared in a laminated "poly-ply", "poly-component" structure in accordance with the present invention. In doing this, a mixture of 4.8 parts of alpha-naphthol and 5.0 parts of a high molecular weight sodium polyacrylate was combined with stirring with 10.2 parts of deionized water. The gellable mixture so produced was, upon and after gellation, formed into a ribbon and both sides of the ribbon were than coated with another gellable mixture of 5 parts of a solution of 5.25% sodium hypochlorite solution and 2.0 parts of high molecular weight sodium polyacrylate. An excellent "poly-ply", "poly-component" "Sakaguchi Reagent" product was thus formed.

ELEVENTH EXAMPLE

The below-identified procedure was followed to illustrate the preparation of a gelled reagent material in accordance with the present invention arranged in a sub-concentrically modular form, i.e., one constructed and arranged in the form of a tablet or lozenge or spheroid or prolate spheroid or oblate spheroid or the like constitution, having layers if desired.

A "Bendict Solution" construction was made. To do this, a solution of 5.8 parts of cupric sulfate pentahydrate in 19.0 parts of deionized water was made and gelled by adding thereto 4.0 parts of a high molecular weight sodium polyacrylate. The gel was shaped into spheres and the spheres were then coated with a solution of sodium polyacrylate in water and dried. Another solution was prepared by dissolving 57.6 parts of sodium citrate in 80 parts of deionized water and then adding thereto 24 parts of high molecular weight sodium polyacrylate. This was concentrically coated on the coated spherical cores first made in a coating ration of about 1:2 between the core sphere and the first reagent ply. The coated spheres were then again coated with sodium polyacrylate. A second reagent ply was prepared by gelling a 21% solution of sodium carbonate in water with sodium polyacrylate, with the pH adjusted to 13. This second reagent ply coating was put on the previously prepared coated sphere core in concentric arrangement in a weight ratio of 1:1. Following this, the entire construction was again superficially coated with sodium polyacrylate. After drying, an excellent quality and good-performing "Benedict Reagent" giving entirely satisfactory results in use was provided in the form of a gelled reagent material that was in a multiple-ply, speroidal, concentrically-stratified or -laminar, modular arrangement.

The foregoing Examples illustrate that reagents, combinations of reagents and/or reagent/catalyst mixtures of various types can be prepared in highly useful and convenient forms by practice of the invention following a technique or process in which the materials are gelled, singly or in combination, and if desired coated and/or encapsulated. It is to be emphasized that encapsulation, per se, is not purported to be invented herein; the encapsulation is only an alternate form of the new and novel shaped gelled reagent material herein described. As demonstrated in the Examples, the reagents useful are liquidous organometallic compounds, the liquid or solutions of ionic polymerization initiators, and the metal hydrides, -aryloxides and -amides, solvent-reagents, acid halides, compounds having a sulfur-to-reactable hydrogen bond, acids, bases, salts, anhydrides of acids and bases, metal ions, halogens, reactive nitrogen-containing compounds, compounds capable of reacting with the hydrogens as determinable by the Zerewitinoff-Chugaev reagent, compounds having hydrogen which are reactive with alkoxide ions, organic compounds having at least one reactive halogen atom, resonace hybrid compounds, ortho esters, alkylidene triaryl phosphoranes, "N-ylides", "P-ylenes", imido esters, alkylidene triaryl phosphorane derivatives, esters of boric-, phosphoric- and/or silicic-acids, phosphite esters, methodides, redox reagents, color test reagents, etc. The Examples further demonstrate the possibilities of using various gelling agents alone or in combination that are polymeric products obtained and derivable from monomers (or, in some cases, even preformed polymers) of water-soluble and water-insoluble ionizable polymerizable momomeric compounds and substances; polymerizable vinyl and vinylidene compounds having no practical degree of solubility in water; polycondensation polymers; and polymers containing phosphorous, sulfer and boron in the polymer chain.

Various changes and modifications can be entered into in the practice of the present invention above and beyond the several illustrative embodiments and particulars set forth in the foregoing description and specification. Accordingly, the invention is to be interpreted and liberally construed in the light of what is recited and set forth according to the definition and meaning of the hereto-appended claims.

I claim:

1. A shaped dimensionally-stable reagent material product of appropriate stoichiometrically proportionate compositions comprising at least one chemically active liquid reagent substance, said reagent substance being a part of a solidified gel phase, the primary gelling agent thereof consisting of a polymeric material capable of forming said gel in the presence of said liquid chemically active reagent substance and being non-deleterious with the reagent substance, and the gel being susceptible to de-gellation when said gelled reagent material product is subjected to exposure to the reaction medium in which said gelled reagent substance is intended to be employed.

2. A product according to claim 1, wherein the chemically reactive reagent substance of the gelled reagent material is pyrophoric.

3. A product according to claim 1, wherein the chemically reactive reagent substance of the gelled reagent material is an organometallic compound.

4. A product according to claim 1, wherein the chemically reactive reagent substances are disposed in a plurality of separate layers of a composite gelled entity.

5. A product according to claim 1, wherein the gelled reagent comprises one having the form of a ribbon, a sub-concentrically modular form, and spherical form.

6. The reagent material product of claim 1 protected by a dispersible inert protective coating.

* * * * *